United States Patent
Sudo

(10) Patent No.: US 6,584,092 B1
(45) Date of Patent: Jun. 24, 2003

(54) APPARATUS AND METHOD FOR OFDM COMMUNICATION

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/433,205

(22) Filed: Nov. 4, 1999

(30) Foreign Application Priority Data

Nov. 6, 1998 (JP) .......................................... 10-316699

(51) Int. Cl.$^7$ ............................................... H04B 7/208
(52) U.S. Cl. ...................... 370/344; 375/326; 375/340; 375/348; 375/349; 455/65
(58) Field of Search ............................. 455/65; 375/340, 375/343, 349, 348, 346, 326, 260; 370/344, 208–209; 329/306, 307, 308

(56) References Cited

U.S. PATENT DOCUMENTS

| | | | |
|---|---|---|---|
| 5,602,835 A | | 2/1997 | Seki et al. |
| 5,905,742 A | * | 5/1999 | Chennakeshu et al. ...... 714/792 |
| 5,991,289 A | * | 11/1999 | Huang et al. ............... 370/350 |
| 2002/0114270 A1 | * | 8/2002 | Pierzga et al. .............. 370/208 |

FOREIGN PATENT DOCUMENTS

| | | |
|---|---|---|
| DE | 19733825 | 2/1999 |
| EP | 0653858 | 5/1995 |
| EP | 0772332 | 5/1997 |
| EP | 0798903 | 10/1997 |
| JP | 10294711 | 11/1998 |
| KR | 1998069730 | 10/1998 |

OTHER PUBLICATIONS

Stantchev et al. "Burst Synchronization for OFDM–Based Cellular Systems with Separate Signaling Channel", Vehicular Technology Conference, 1998, 48th IEEE Ottawa, Ont., Canada, pp. 758–762.
English Language Abstract of DE 19733825.
English Language Abstract of JP 10–29411.
T. Onizawa et al., "Synchronization Scheme of OFDM Systems For High Speed Wireless LAN", 1998, with an English language Abstract.

* cited by examiner

Primary Examiner—Lester G. Kincaid
Assistant Examiner—Ronald J. Ward
(74) Attorney, Agent, or Firm—Greenblum & Bernstein, P.L.C.

(57) ABSTRACT

Delay circuits 409 and 410 delay a digital baseband signal received by one symbol. Complex multiplier 411 performs a complex multiplication using the received digital baseband signal and the signal delayed by delay circuits 409 and 410. Of the multiplication result of complex multiplier 411, second accumulator 412 outputs the value resulting from an accumulation of the multiplication result of the phase reference symbol in the received digital baseband signal and that of the last half of the synchronization symbol in the delayed signal to frequency offset detector 413.

8 Claims, 15 Drawing Sheets

APPARATUS AND METHOD FOR OFDM COMMUNICATION

BACKGROUND OF THE INVENTION

1. Field of the Invention

The present invention relates to an apparatus and method used for OFDM (Orthogonal Frequency Division Multiplexing) based mobile communications.

2. Description of the Related Art

A conventional communication apparatus used for OFDM-based mobile communications (hereinafter referred to as "OFDM communication apparatus") is explained using FIG. 1 and FIG. 2. FIG. 1 is a block diagram showing a configuration of a conventional OFDM communication apparatus and FIG. 2 is a schematic diagram showing a frame format in an OFDM-based radio communication.

First, the configuration of the conventional OFDM communication apparatus is explained using FIG. 1. A baseband signal is input to quasi-coherent detector 101. This baseband signal is a signal received from an antenna which is not shown in the diagram and then subjected to normal radio reception processing by a radio reception section which is not shown in the diagram. Quasi-coherent detector 101 is controlled by a local signal output from oscillator 114 which will be described later and performs quasi-coherent detection on the input baseband signal. LPF (analog low-pass filters) 102 and 103 eliminate an unnecessary frequency component of the signal subjected to quasi-coherent processing. A/D converters 104 and 105 convert the analog signal with the unnecessary frequency component eliminated to a digital signal.

FFT (Fast Fourier Transform; hereinafter referred to as "FFT") circuit 106 performs FFT processing on the A/D-converted signal using the output signal of timing generator 116 which will be described later as a trigger signal. Demodulation section 107 demodulates the FFT-processed signal. Determination section 108 determines the demodulated signal.

Delay circuits 109 and 110 delay the A/D-converted signal. Complex multiplier 111 performs complex multiplications using the A/D-converted signals and delayed signals. Accumulator 112 accumulates the complex multiplication result of complex multiplier 111 and outputs the accumulation result to maximum value detector 115 and frequency offset detector 113.

Maximum value detector 115 detects a maximum value of the accumulation result of accumulator 112. When maximum value detector 115 detects the maximum value, timing generator 116 outputs a signal to start FFT processing to FFT circuit 106.

Frequency offset detector 113 calculates a frequency offset necessary for frequency offset compensation using the accumulation result of accumulator 112 and outputs the calculation result to oscillator 114. Oscillator 114 outputs a local signal with frequency offset compensation to quasi-coherent detector 101.

Then, the operation off the conventional OFDM communication apparatus is explained. A signal input via an antenna which is not shown in the diagram is subjected to normal radio reception processing by a radio reception section which is not shown in the diagram and converted to a baseband signal. This baseband signal is subjected to quasi-coherent detection processing by quasi-coherent detector 101. The baseband signal subjected to quasi-coherent detection processing by quasi-coherent detector 101 is stripped of an unnecessary frequency component by LPF 102 and 103, converted to a digital signal by A/D converters 104 and 105, and becomes a digital baseband signal.

The digital baseband signal is subjected to FFT processing by FFT circuit 106 where a signal assigned to each sub-carrier is obtained. The signal processed by FFT circuit 106 is demodulated by demodulator 107, determined by determination section 108 and becomes a demodulated signal.

On the other hand, the communication apparatus in an OFDM-based mobile communication needs to provide timing so that FFT is started with symbol synchronization established with a base station, the transmitting side.

The following is an explanation of how symbol synchronization is established.

In an OFDM-based mobile communication, symbol synchronization is generally established using a synchronization symbol inserted after an AGC (gain control) symbol of each symbol and a phase reference symbol which is identical to the synchronization symbol as shown in FIG. 2. The phase reference symbol is followed by a guard segment and valid symbol.

First, complex multiplier 111 performs complex multiplications on signals before FFT processing and other signals before FFT processing which have been delayed by one symbol (unit symbol) by delay circuits 109 and 110.

Then, accumulator 112 accumulates the output of complex multiplier 111. Since the synchronization symbol and the phase reference symbol have the identical waveform as described above, the accumulation result shows a peak at the start of each guard segment. Maximum value detector 115 detects the accumulation result at this peak. Then, a signal indicating that maximum value detector 115 has detected a maximum value is sent to timing generator 116. A signal to start FFT processing is sent to FFT circuit 106 by timing generator 116 that has received this signal. FFT circuit 106 receives the signal from timing generator 116 and starts FFT processing.

Through the operation described above, the communication apparatus in the OFDM-based mobile communication can establish symbol synchronization and provide FFT start timing.

Furthermore, since an OFDM-based mobile communication is greatly affected by deterioration of the reception characteristic due to a frequency offset, frequency offset compensation is carried out. The operation of frequency offset compensation is explained below.

In an OFDM-based mobile communication, frequency offset compensation is generally carried out using the synchronization symbol and phase reference symbol shown in FIG. 2.

First, as described above, complex multiplier 111 performs complex multiplications on signals before FFT processing and other signals before FFT processing which have been delayed by one symbol (unit symbol) by delay circuits 109 and 110. Accumulator 112 accumulates the complex multiplication results and sends the result to frequency offset detector 113.

Frequency offset detector 113 calculates the amount of phase rotation using the accumulation result of accumulator 112 and calculates a frequency offset from this amount of phase rotation. This frequency offset is sent to oscillator 114.

Using the frequency offset sent from frequency offset detector 113, oscillator 114 generates a local signal with frequency offset compensation and sends it to quasi-coherent detector 101. Quasi-coherent detector 101 performs quasi-coherent detection under the control of the local signal sent from oscillator 114.

Through the operation described above, the communication apparatus in the OFDM-based mobile communication prevents deterioration of the reception characteristic due to a frequency offset.

However, the conventional apparatus has the following problems. That is, under a multi-path environment, as shown in FIG. 3, the OFDM communication apparatus receives n delay waves, delay wave 1 to delay wave n, in addition to a dominant wave. Thus, the synchronization symbol in the dominant wave receives interference by n AGC symbols of respective delay waves. That is, the synchronization symbol in the dominant wave receives interference because the synchronization symbol in the dominant wave has a time area overlapping with the AGC symbols of delay wave 1 to delay wave n.

Especially, if the delay time of each delay wave is short, the level of the delay wave is high, and therefore the synchronization symbol in the dominant wave, or more specifically, the first half of this synchronization symbol receives greater interference between symbols.

Thus, if the entire synchronization symbol is used for accumulation processing at the time of the aforementioned frequency offset compensation, the conventional apparatus has the problem of the accuracy of frequency offset detection deteriorating.

SUMMARY OF THE INVENTION

It is an objective of the present invention to provide an OFDM communication apparatus that improves the detection accuracy of a frequency offset in a multi-path environment.

This objective is achieved by using a part of a synchronization symbol that is less affected by interference between symbols.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 1 is a block diagram showing a configuration of a fifth accumulator in the OFDM communication apparatus according to Embodiment 4 of the present invention;

DETAILED DESCRIPTION OF THE PREFERRED EMBODIMENTS

With reference now to the attached drawings, the embodiments of the present invention are explained in detail below.

Embodiment 1

Figure 4:
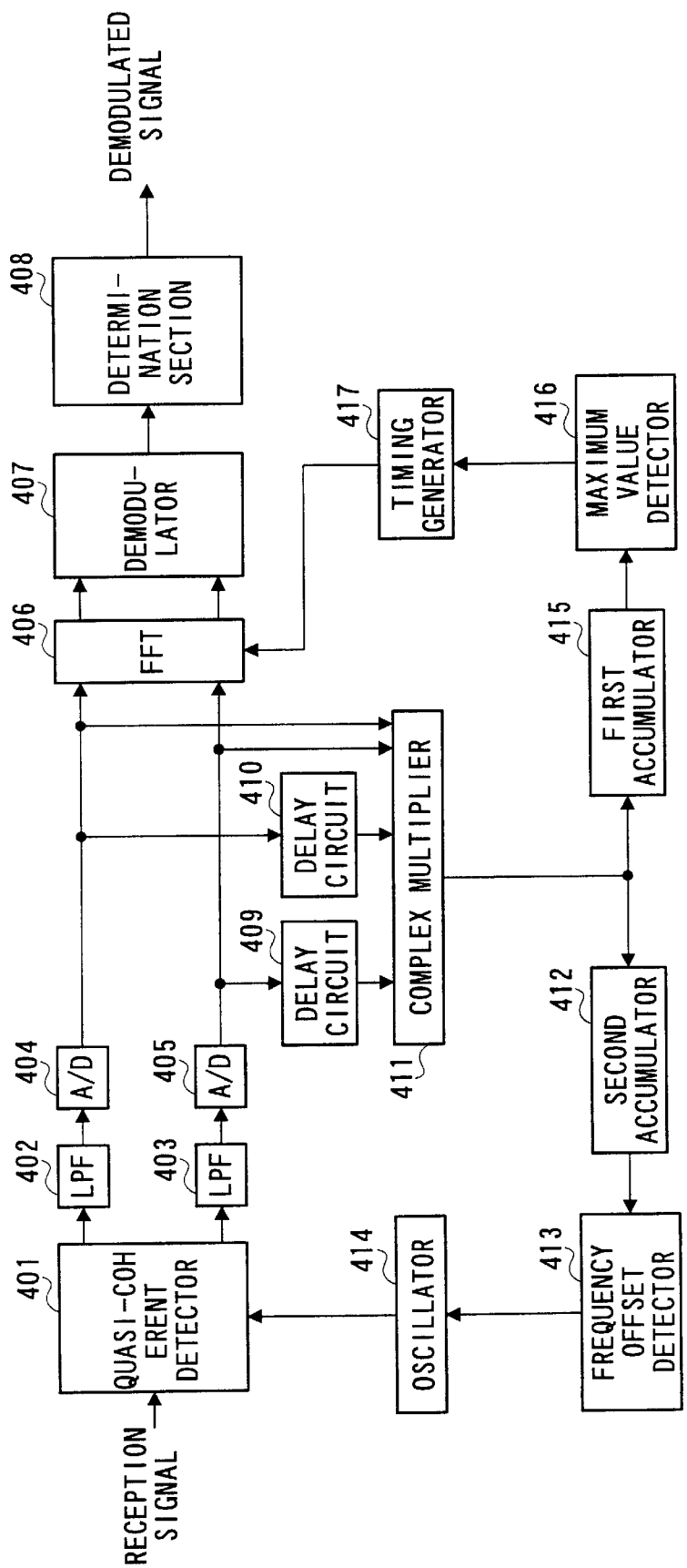
FIG. 4 is a block diagram showing a configuration of an OFDM communication apparatus according to Embodiment 1 of the present invention.

FIG. 4 is a block diagram showing a configuration of an OFDM communication apparatus according to Embodiment 1 of the present invention.

A radio reception section which is not shown in the diagram carries out normal radio reception processing on a signal received via an antenna which is not shown in the diagram to convert it to a baseband signal. Quasi-coherent detector 401, controlled by a local signal output from oscillator 414 which will be described later, carries out quasi-coherent processing on the baseband signal output from the radio reception section. Furthermore, quasi-coherent detector 401 separates the baseband signal subjected to quasi-coherent detection processing into an in-phase channel (hereinafter referred to as "I-channel") and quadrature channel (hereinafter referred to as "Q-channel") and outputs these signals.

LPF (analog low-pass filter) 402 and LPF 403 eliminate unnecessary frequency components of the I-channel and Q-channel of the signal subjected to quasi-coherent detection processing by quasi-coherent detector 401, respectively. A/D converters 404 and 405 convert the analog signals whose unnecessary frequency components have been eliminated by LPF 402 and LPF 403 to digital signals, respectively.

FFT (Fast Fourier Transform; hereinafter referred to as "FFT") circuit 406 carries out FFT processing on the I-channel signal and Q-channel signal converted to digital signals by A/D converters 404 and 405 respectively, using the output signal of timing generator 417 which will be described later as a trigger.

Demodulator 407 demodulates the I-channel signal and Q-channel signal FFT-processed by FFT circuit 406. Determination section 408 determines the signal demodulated by demodulator 407.

Delay circuits 410 and 409 delay the I-channel signal and Q-channel signal converted to digital signals by A/D converters 404 and 405, respectively.

Complex multiplier 411 inputs the I-channel and Q-channel signals converted to digital signals by A/D converters 404 and 405 respectively, and the I-channel and Q-channel signals delayed by delay circuits 410 and 409 respectively. Complex multiplier 411 further performs complex multiplications using the signals input above and outputs the multiplication result to first accumulator 415 and second accumulator 412.

First accumulator 415 and second accumulator 412 accumulate the multiplication result from complex multiplier 411. First accumulator 415 and second accumulator 412 perform an accumulation using different methods. The specific accumulation methods of first accumulator 415 and second accumulator 412 will be described later.

Maximum value detector 416 detects a maximum value of the accumulation result of first accumulator 415. Timing generator 417 outputs a signal to start the aforementioned FFT processing to FFT circuit 406 when maximum value detector 416 detects the maximum value.

Frequency offset detector 413 calculates a frequency offset necessary for frequency offset compensation using the accumulation result of second accumulator 412 and outputs the calculation result to oscillator 414. Oscillator 414 creates a local signal with frequency offset compensation using the frequency offset output from frequency offset detector 413 and outputs it to quasi-coherent detector 401.

Then, the operation of the OFDM communication apparatus with the above configuration is explained.

A signal input via an antenna which is not shown in the diagram is subjected to normal radio reception processing by a radio reception section which is not shown in the diagram and converted to a baseband signal. This baseband signal is separated into an I-channel and Q-channel after being subjected to quasi-coherent detection processing by quasi-coherent detector 401.

The I-channel and Q-channel subjected to quasi-coherent detection processing by quasi-coherent detector 401 are stripped of unnecessary frequency components by LPF 402 and LPF 403 and converted to digital signals by A/D converters 404 and 405, and become digital baseband signals.

The I-channel and Q-channel of the digital baseband signals output from A/D converters 404 and 405 are subjected to FFT processing by FFT circuit 406 where a signal assigned to each sub-carrier is obtained. The I-channel and Q-channel output from FFT circuit 406 are demodulated by demodulator 407. The signals demodulated by demodulator 407 are determined by determination section 408 and become demodulated signals.

On the other hand, the OFDM reception apparatus according to the present embodiment needs to provide timing so that FFT processing is started with symbol synchronization established with the base station apparatus, the transmitting side. This symbol synchronization is explained below.

Figure 1:
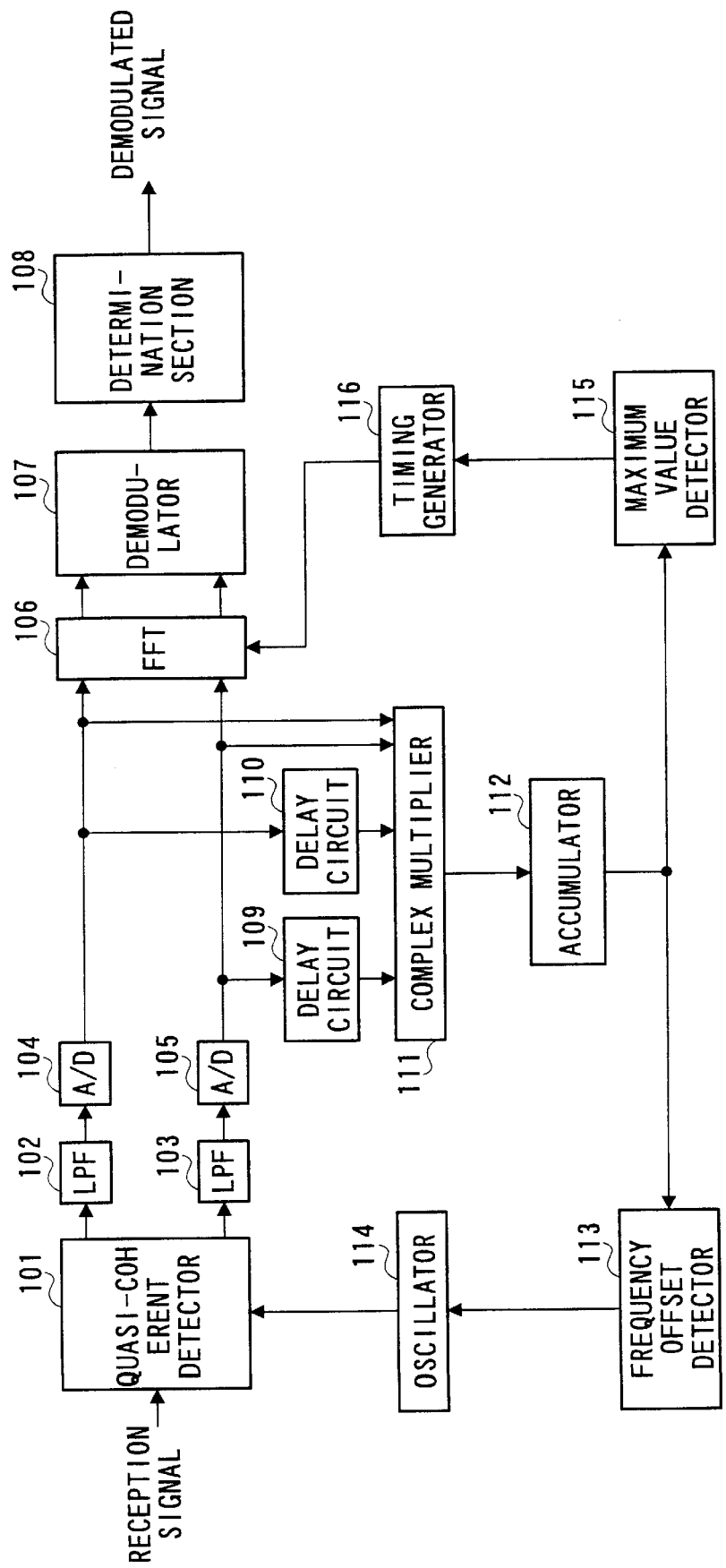
FIG. 1 is a block diagram showing a communication apparatus in a conventional OFDM-based mobile communication.
Figure 2:
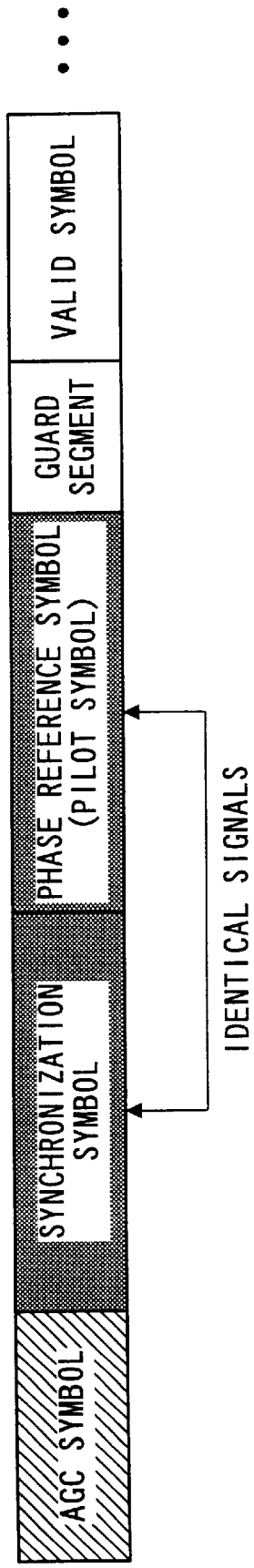
FIG. 2 is a schematic diagram showing a frame format in the OFDM-based mobile communication.
Figure 3:
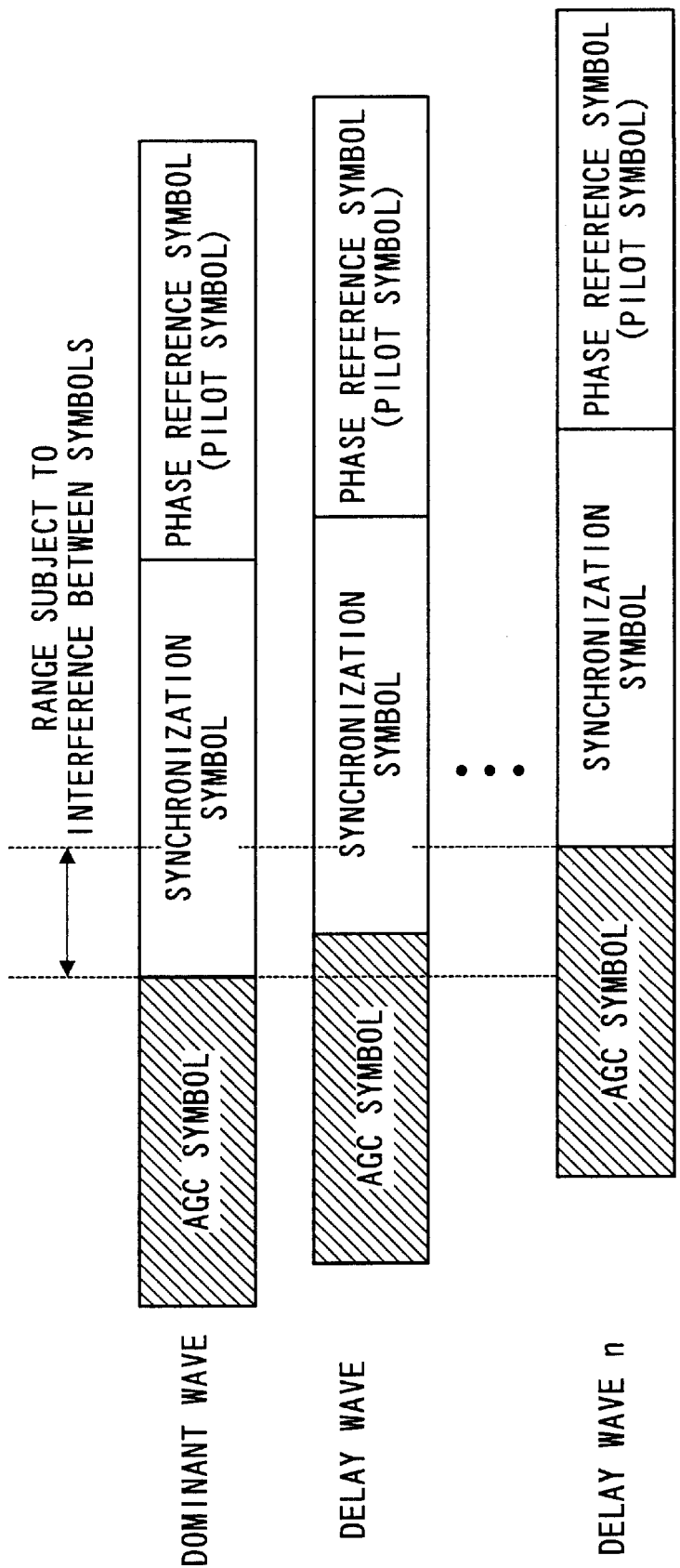
FIG. 3 is a schematic diagram showing signal waves that the communication apparatus in the conventional OFDM-based mobile communication receives.

The OFDM communication apparatus according to the present embodiment receives a signal in the frame format shown in FIG. 2. As shown in FIG. 2, the start AGC (gain control) symbol is followed by a synchronization symbol and a phase reference symbol which is identical to the synchronization symbol and further followed by a guard segment and a valid symbol.

The OFDM communication apparatus according to the present embodiment establishes symbol synchronization using the synchronization symbol and phase reference symbol.

First, complex multiplier 411 performs complex multiplications using the I-channel and Q-channel of signals before FFT processing and outputs the multiplication result to first accumulator 415, and at the same time performs complex multiplications using the I-channel and Q-channel of signals before FFT processing delayed by one symbol by delay circuits 409 and 410 and outputs the multiplication result to first accumulator 415. Then, first accumulator 415 accumulates the multiplication result of complex multiplier 411. Here, the accumulation result of first accumulator 415 is explained using FIG. 5.

Figure 5:
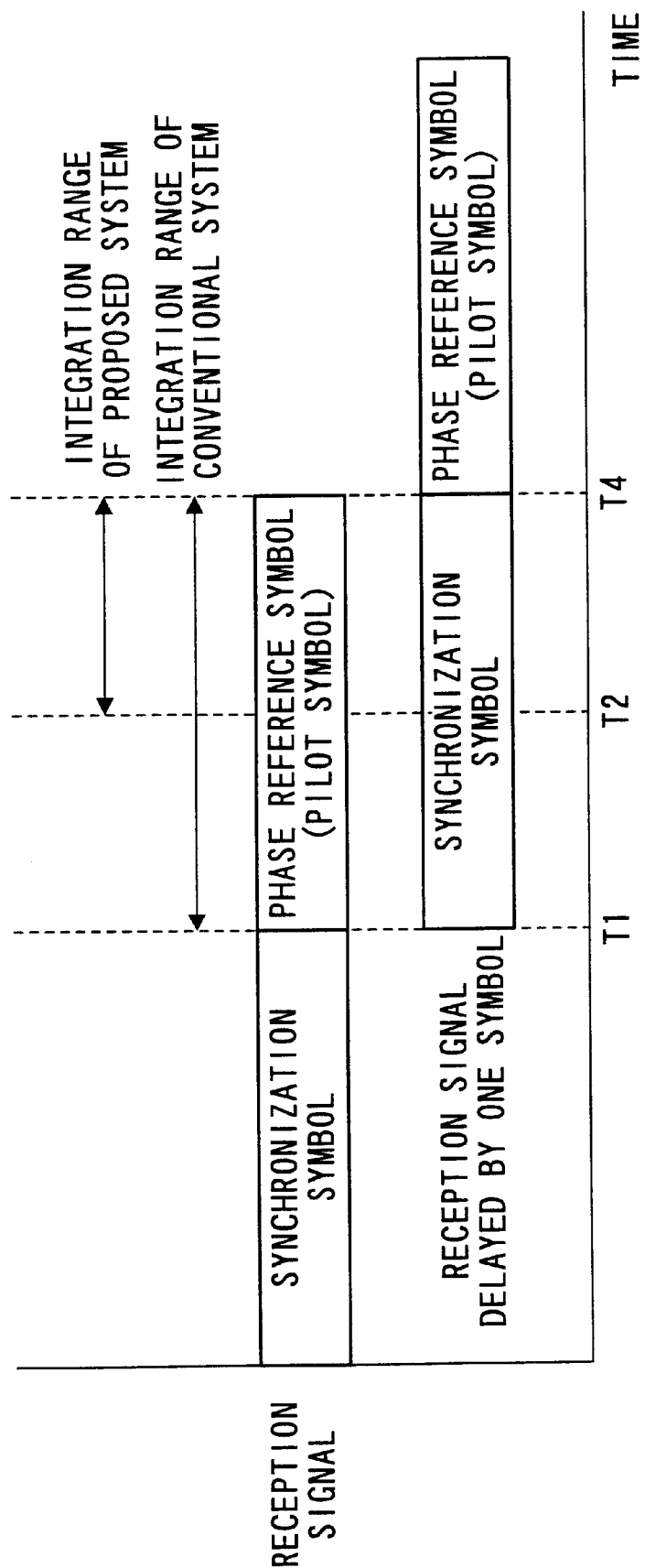
FIG. 5 is a schematic diagram showing the result of a delay of a reception signal by a delay circuit of the OFDM communication apparatus according to Embodiment 1 of the present invention.

FIG. 5 is a schematic diagram showing the result of a delay of a reception signal by the delay circuits of the OFDM communication apparatus according to Embodiment 1.

In the diagram, a reception signal before FFT processing is shown in the upper row and another reception signal before FFT processing which has been delayed by one symbol by delay circuit 409 in the lower row. Though not shown in the diagram, the synchronization symbols in the reception signals in the upper row and lower row are preceded by AGC (gain control) symbols. As is obvious from the diagram, the phase reference symbol in the reception signal in the upper row and the synchronization symbol in the delayed reception signal in the lower row have such a relationship that both symbols overlap in the time span between time $T_1$ and time $T_4$.

Through the relationship above, the accumulation result of first accumulator 415 produces a peak with the phase reference symbol in the delayed reception signal. Maximum value detector 416 detects the accumulation result at this peak. Then, maximum value detector 416 sends a signal indicating that a maximum value has been detected to timing generator 417. By timing generator 417 that has received this signal, a signal to start FFT processing is sent to FFT circuit 406. FFT circuit 406 receives a signal from timing generator 417 and starts FFT processing.

Through the operation above, the OFDM-based communication apparatus according to the present embodiment can establish symbol synchronization and provide FFT start timing.

Furthermore, the OFDM-based communication apparatus according to the present embodiment carries out frequency offset compensation using the abovementioned synchronization symbol and phase reference symbol. The frequency offset compensation is explained below.

First, second accumulator 412 accumulates the abovementioned multiplication result of complex multiplier 411. The specific accumulation method of second accumulator 412 is as follows:

As shown in FIG. 5, the start part of the synchronization symbol in the reception signal in the upper row is likely to have received interference by the AGC symbol in the delayed wave. That is, the start part of the synchronization symbol in the signal in the lower row which is delayed by one symbol from the reception signal in the upper row is also likely to have received the above mentioned interference. Therefore, using the start part of the synchronization symbol in the signal in the lower row for the offset compensation explained here reduces the accuracy.

For the above reason, second accumulator 412 accumulates the multiplication result of complex multiplier 411 from time $T_2$ to time $T_4$ shown in FIG. 5 without using the part subject to interference by the delay wave. The example here explains the case where second accumulator 412 starts an accumulation from time $T_2$, but the time at which the accumulation is started can also be changed as appropriate according to the level of interference by the delay wave. This is the accumulation method using the second accumulator.

Then, the accumulation result of second accumulator 412 is sent to frequency offset detector 413. Frequency offset detector 413 calculates an amount of phase rotation using the accumulation result of second accumulator 412 and calculates a frequency offset from this amount of phase rotation. This frequency offset is sent to oscillator 414.

Oscillator 414 creates a local signal with frequency offset compensation using the frequency offset sent from frequency offset detector 413 and sends this local signal to quasi-coherent detector 401. Quasi-coherent detector 401, controlled by the local signal sent from oscillator 414, performs quasi-coherent detection processing.

Through the operation above, the OFDM communication apparatus according to the present embodiment carries out frequency offset compensation.

As shown above, according to the OFDM communication apparatus of the present embodiment, second accumulator 412 does not accumulate the complex multiplication result of the part of the phase reference symbol and synchronization symbol used for frequency offset compensation subject to interference by the delay wave, and therefore frequency offset detector 413 can detect a correct frequency offset. Therefore, the OFDM communication apparatus according to the present embodiment can perform accurate frequency offset compensation even in a multi-path environment.

Embodiment 2

Embodiment 2 is an embodiment in which a single accumulator simultaneously serves as first accumulator 415 for symbol synchronization and as second accumulator 412 for frequency offset compensation in Embodiment 1.

Figure 6:
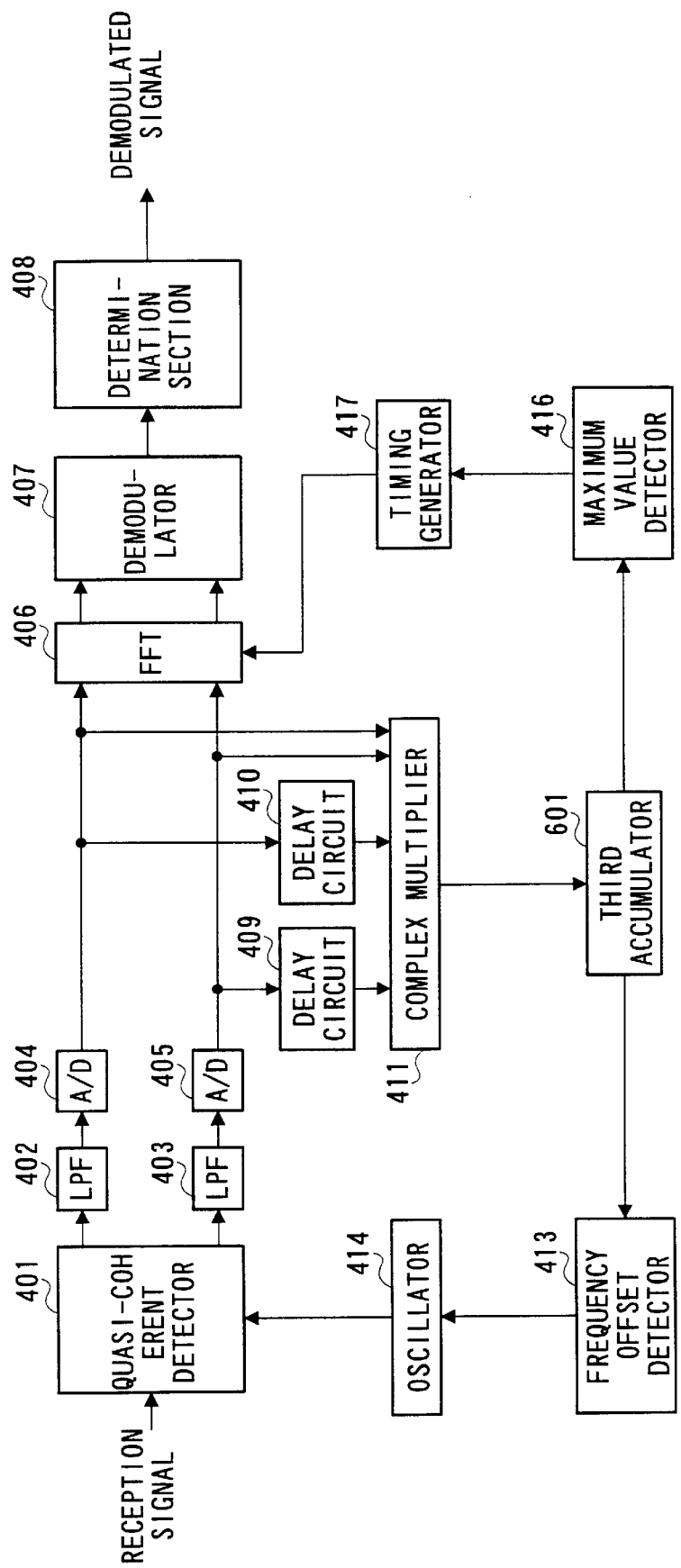
FIG. 6 is a block diagram showing a configuration of an OFDM communication apparatus according to Embodiment 2 of the present invention.

FIG. 6 is a block diagram showing a configuration of an OFDM communication apparatus according to Embodiment 2 of the present invention. The configuration of the OFDM communication apparatus according to the present embodiment is the same as the configuration of the OFDM communication apparatus according to Embodiment 1 except that first accumulator 415 and second accumulator 412 are substituted by third accumulator 601, and therefore the part of configuration in FIG. 6 identical to that in FIG. 4 is assigned the same numbers as in FIG. 4 and detailed explanations of that part are omitted.

Figure 7:
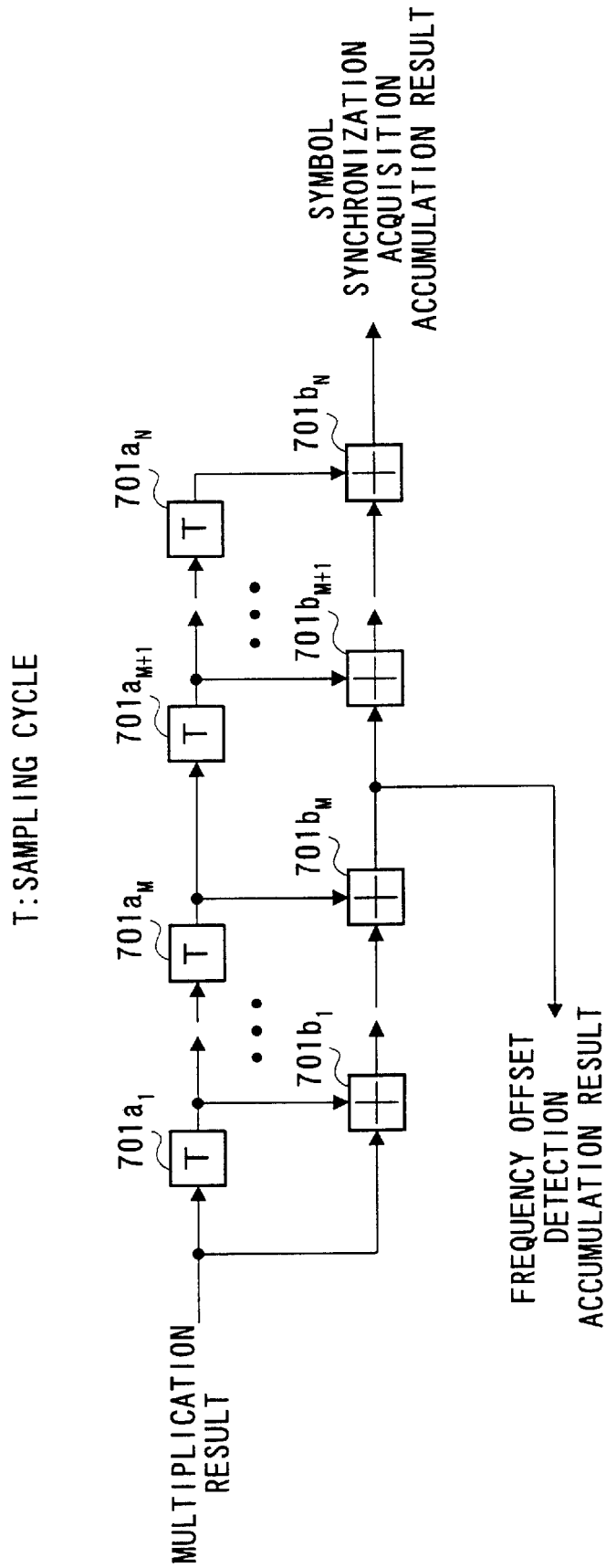
FIG. 7 is a block diagram showing a configuration of a third accumulator in the OFDM communication apparatus according to Embodiment 2 of the present invention.

The configuration of third accumulator 601 is explained below using FIG. 7. FIG. 7 is a block diagram showing a configuration of third accumulator 601 in the OFDM communication apparatus according to Embodiment 2.

In FIG. 7, delay circuit $701a_1$ delays the multiplication result sent from complex multiplier 411 shown in FIG. 6 (hereinafter referred to as "complex multiplication result") by sampling cycle T and outputs it to delay circuit $701a_2$. Delay circuit $701a_2$ delays the signal output from delay circuit $701a_1$ by sampling cycle T and outputs it to delay circuit $701a_3$. Likewise, delay circuit $701a_M$ delays the signal output from delay circuit $701a_{M-1}$ by sampling cycle T and outputs it to delay circuit $701a_{M+1}$. Furthermore, delay circuit $701a_N$ delays the signal output from delay circuit $701a_{N-1}$ by sampling cycle T and outputs it to adder $701b_N$.

Adder $701b_1$ adds up the complex multiplication result and the signal output from delay circuit $701a_1$ and outputs the addition result to adder $701b_2$. Adder $701b_2$ adds up the signal output from adder $701b_1$ and signal output from delay circuit $701a_2$ and outputs the addition result to adder $701b_3$. Likewise, adder $701b_M$ adds up the signal output from adder $701b_{M-1}$ and signal output from delay circuit $701a_M$ and outputs the addition result to adder $701b_{M+1}$ and frequency offset detector 413. Furthermore, adder $701b_N$ adds up the signal output from adder $701_{N-1}$ and the signal output from delay circuit $701a_N$ and outputs the addition result to maximum value detector 416 shown in FIG. 6.

Then, the operation of third accumulator 601 in the configuration above is explained with reference to FIG. 5.

First, the complex multiplication result at time $T_1$ is input to third accumulator 601 by complex multiplier 411 shown in FIG. 6. The complex multiplication result at time $T_1$ is input to delay circuit $701a_1$, and adder $701b_1$.

At time ($T_1$+T), that is a point in time at which time T has elapsed, the complex multiplication result at time $T_1$ is input by delay circuit $701a$ to delay circuit $701a_2$ and adder $701b_1$. At the same time, complex multiplier 411 inputs the complex multiplication result at time ($T_1$+T) to third accumulator 601. Therefore, adder $701b_1$ outputs the result of an addition of the complex multiplication results at time $T_1$ and time ($T_1$+T).

Furthermore, at time ($T_1$+2×T), that is a point in time at which time T has elapsed, the complex multiplication result at time $T_1$ is input by delay circuit $701a_2$ to delay circuit $701a_3$ and adder $701b_2$. At the same time, complex multiplier 411 inputs the complex multiplication result at time ($T_1$+2×T) to third accumulator 601. Therefore, adder $701b_2$ outputs the result of an addition of the complex multiplication results at time $T_1$, time ($T_1$+T) and time ($T_1$+2×T). Furthermore, adder $701b_1$ outputs the result of an addition of the complex multiplication results at time ($T_1$+T) and time ($T_1$+2×T).

Likewise, at time ($T_1$+N×T) that is a point in time at which time (N×T) has elapsed from time $T_1$, the complex multiplication result at time $T_1$ is output from delay circuit $701a_N$ and input to adder $701b_N$. At the same time, complex multiplier 411 inputs the complex multiplication result at time ($T_1$+N×T) to third accumulator 601. Therefore, adder $701b_N$ outputs the result of an addition of the complex multiplication results from time $T_1$ to time ($T_1$+N×T). Furthermore, adder $701b$M outputs the result of an addition of the complex multiplication results from time ($T_1$+M×T) to time ($T_1$+N×T).

Here, third accumulator 601 is provided with N delay circuits $701a_1$, to $701a_N$ and N adders $701b_1$ to $701b_N$ so as to satisfy the following expression, and therefore the accumulation result from time $T_1$ to time $T_4$ is sent to maximum value detector 416.

$$T_4 - T_1 = N \times T \tag{1}$$

Furthermore, in third accumulator 601, adder $701b_M$ is selected to output the accumulation result to frequency offset detection circuit 413 so as to satisfy the following expression, and therefore the accumulation result from time $T_2$ to $T_4$ is sent to frequency offset detection circuit 413.

$$T_4 - T_2 = M \times T \tag{2}$$

Therefore, third accumulator 601 controls so that only at time $T_4$ the accumulation result of adder $701b_N$ is output to maximum value detector 416 and the accumulation result of adder $701b_M$ is output to frequency offset detector 413, making it possible to output accumulation results most suitable to the symbol synchronization and frequency offset compensation above.

As shown above, according to the present embodiment, third accumulator 601 can output different accumulation results separately, and thus can simultaneously serve as a symbol synchronization accumulator and frequency offset compensation accumulator. Therefore, the present embodiment can reduce the hardware scale of the OFDM-based receiver.

Embodiment 3

Embodiment 3 is an embodiment that prevents the frequency offset compensation accumulator in Embodiment 1 from accumulating the complex multiplication result of the part deriving from a symbol synchronization error.

Figure 8:
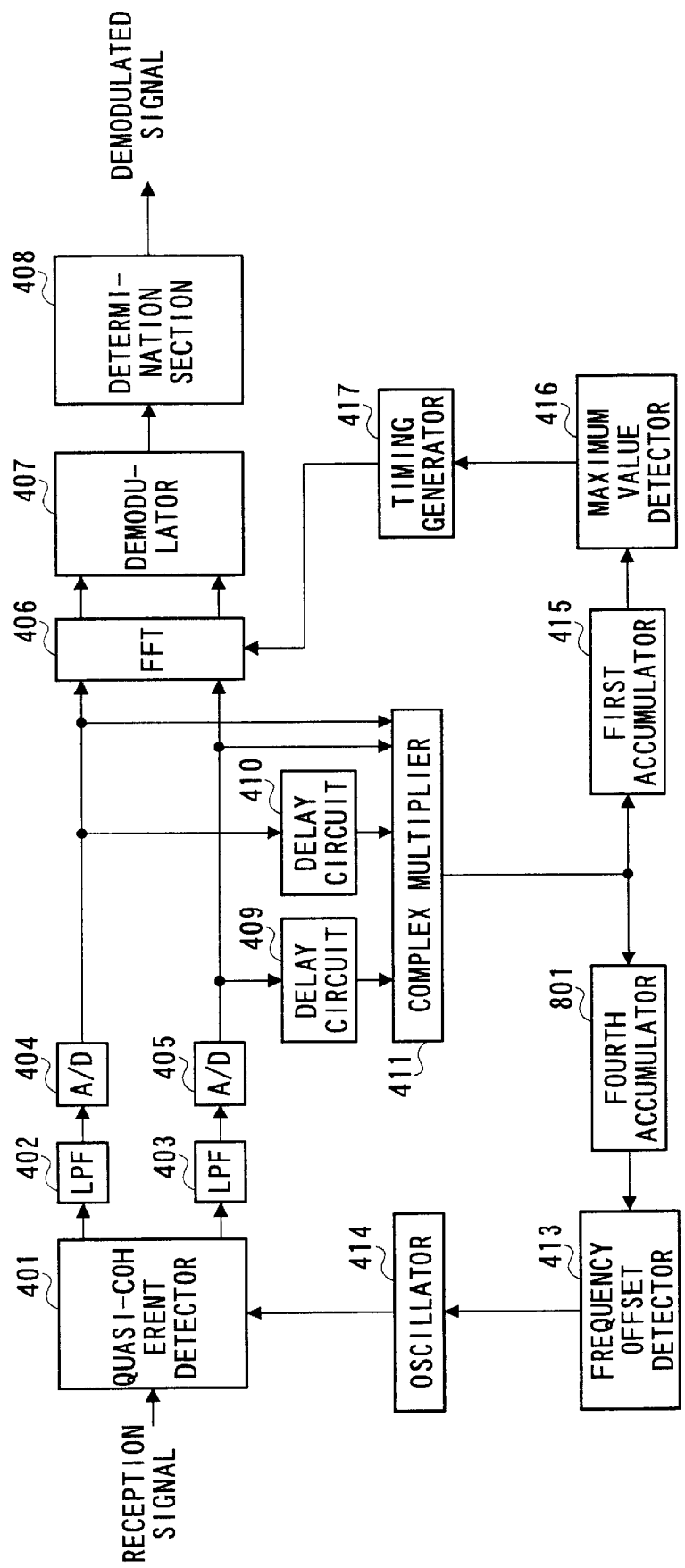
FIG. 8 is a block diagram showing a configuration of an OFDM communication apparatus according to Embodiment 3 of the present invention.

FIG. 8 is a block diagram showing a configuration of an OFDM communication apparatus according to Embodiment 3. The configuration of the OFDM communication apparatus according to the present embodiment is the same as the configuration of the OFDM communication apparatus according to Embodiment 1 except that second accumulator 412 is substituted by fourth accumulator 801, and therefore the part of configuration in FIG. 8 identical to that in FIG. 4 is assigned the same numbers as in FIG. 4 and detailed explanations of that part are omitted.

Figure 9:
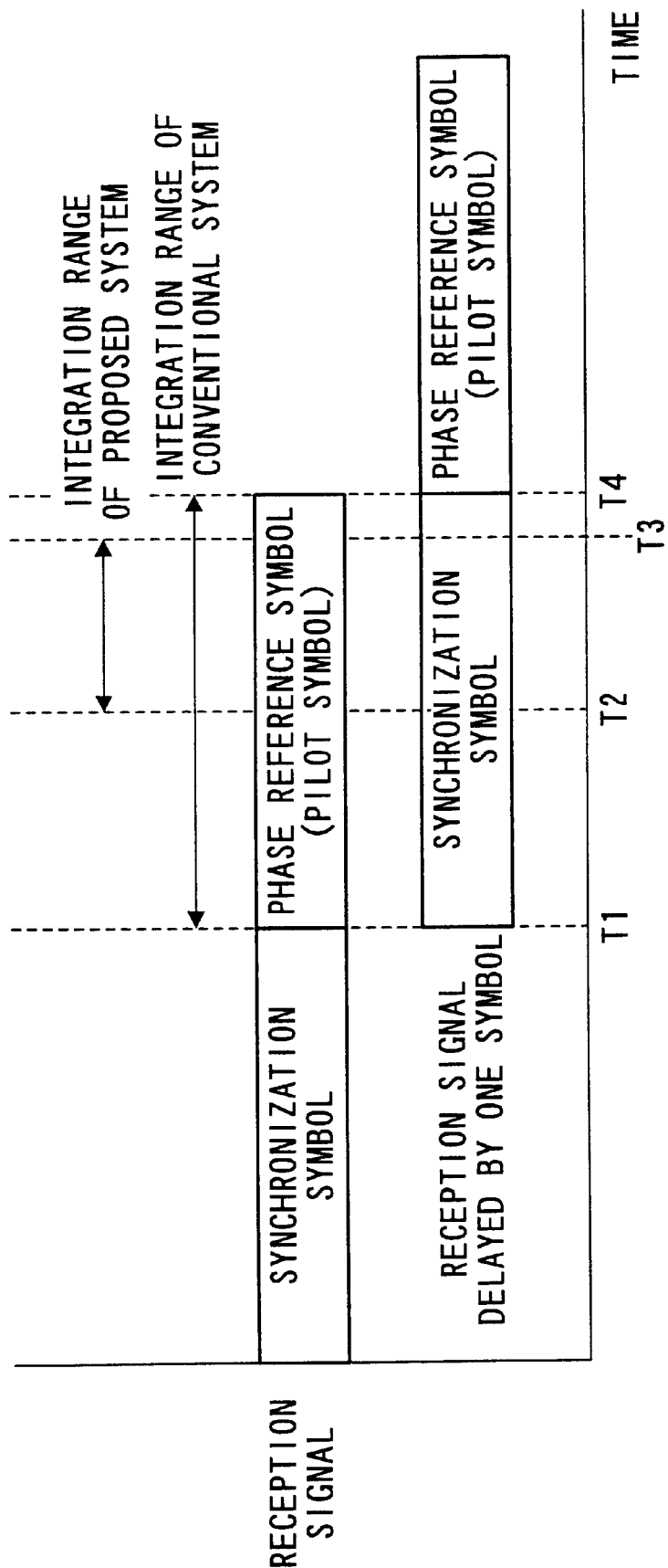
FIG. 9 is a schematic diagram showing an accumulation range of a fourth accumulator in the OFDM communication apparatus according to Embodiment 3 of the present invention.

The configuration of fourth accumulator 801 is explained below using FIG. 9. FIG. 9 is a schematic diagram showing the addition range of fourth accumulator 801 in the OFDM communication apparatus according to Embodiment 3.

The signal received via an antenna which is not shown in the diagram receives interference of a plurality of delay waves in a multi-path environment, and is therefore subject to symbol synchronization errors. Thus, the end part of the phase reference symbol in the reception signal in the upper row shown in FIG. 9 may originally be a guard segment. Therefore, if this part is used when performing complex multiplications in frequency offset compensation, an error may occur in the multiplication result, and moreover detection of an accurate frequency offset may be prevented.

Therefore, fourth accumulator 801 treats the part of the phase reference symbol in the upper row corresponding to time $T_3$ to time $T_4$ as a part containing symbol synchronization errors and outputs the accumulation result of the range from time $T_2$ to time $T_3$ to frequency offset detector 413 shown in FIG. 8. This allows frequency offset detector 413 to detect an accurate frequency offset. The part treated as containing symbol synchronization errors in the above phase reference symbol can be changed as appropriate according to the degree of multi-path.

As shown above, according to the present embodiment, fourth accumulator 801 does not accumulate the complex multiplication result of the part containing symbol synchronization errors, and therefore frequency offset compensation detector 413 can detect an accurate frequency offset.

Embodiment 4

Embodiment 4 is an embodiment in which a single accumulator simultaneously serves as first accumulator 415 for symbol synchronization and as fourth accumulator 801 for frequency offset compensation in Embodiment 3.

Figure 10:
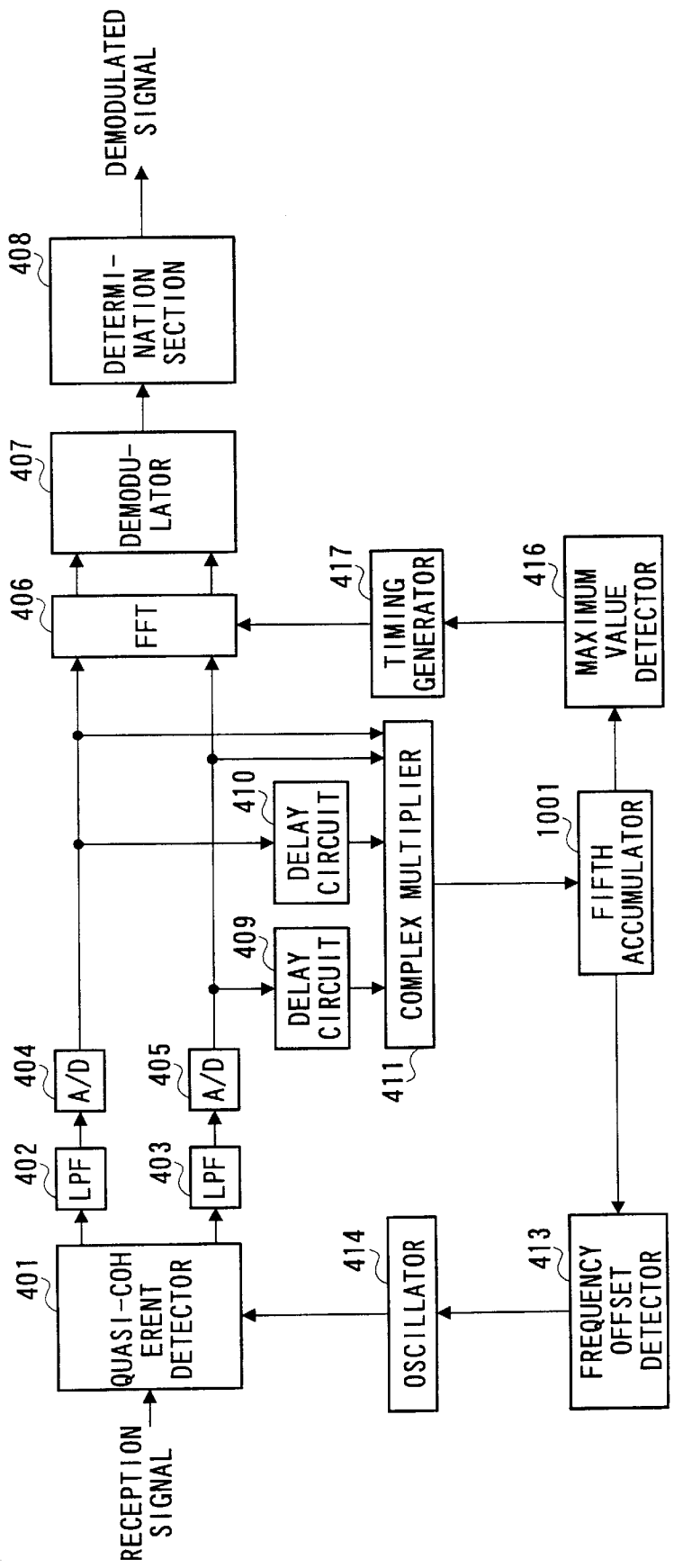
FIG. 10 is a block diagram showing a configuration of an OFDM communication apparatus according to Embodiment 4 of the present invention.

FIG. 10 is a block diagram showing a configuration of an OFDM communication apparatus according to Embodiment 4. The configuration of the OFDM communication apparatus according to the present embodiment is the same as the configuration of the OFDM communication apparatus according to Embodiment 3 except that first accumulator 415 and fourth accumulator 801 are substituted by fifth accumulator 1001, and therefore the part of configuration in FIG. 10 identical to that in FIG. 8 is assigned the same numbers as in FIG. 8 and detailed explanations of that part are omitted.

Figure 11:
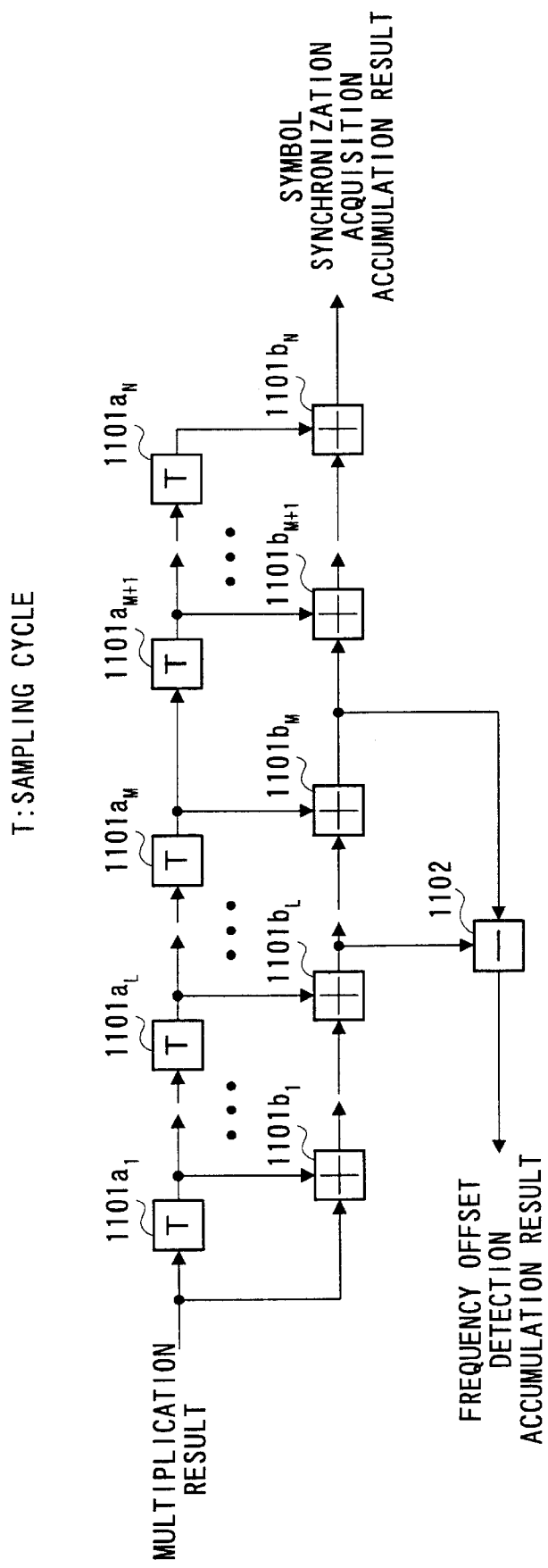

The configuration of fifth accumulator 1001 is explained below using FIG. 11. FIG. 11 is a block diagram showing a configuration of fifth accumulator 1001 in the OFDM communication apparatus according to Embodiment 4.

The configuration of fifth accumulator 1001 is the same as the configuration of third accumulator 601 (FIG. 7) according to Embodiment 2 except that subtractor 802 has been added, and therefore the part of configuration in FIG. 11 identical to that in FIG. 7 is assigned the same numbers as in FIG. 7 and detailed explanations of that part are omitted.

Subtractor 802 outputs a subtraction result between the accumulation result of adder $1101b_L$ and the accumulation result of adder $1101b_M$ to frequency offset detector 413. Here, the method of selecting adder $1101b_L$ and adder $1101b_M$ from among of adder $1101a_1$ to $1101a_N$ is explained using FIG. 9.

First, adder $1101b_L$ is selected so as to satisfy the following expression:

$$T_4 - T_3 = L \times T \tag{3}$$

Through this, adder $1101b_L$ outputs the accumulation result from time $T_3$ to time $T_4$ to subtractor 802.

Furthermore, adder $1101b_M$ is selected so as to satisfy the following expression:

$$T_4 - T_2 = M \times T \tag{4}$$

Through this, adder $1101b_M$ outputs the accumulation result from time $T_2$ to time $T_4$ to subtractor 802.

Therefore, subtractor 802 performs a subtraction between the accumulation result of adder $1101b_L$ selected as shown above and the accumulation result of adder $1101b_M$. That is, subtractor 802 outputs the accumulation result from time $T_2$ to time $T_3$. However, as described above, the timing at which subtractor 802 outputs the subtraction result to frequency offset detector 413 is the time at which the complex subtraction result at time $T_1$ is output from delay circuit $1101a_N$ in FIG. 11.

Thus, according to the present embodiment, fifth accumulator 1001 can output the accumulation result from time $T_1$ to time $T_4$ to maximum,value detector 416 and the accumulation result from time $T_2$ to time $T_3$ to frequency offset detector 413. Therefore, fifth accumulator 1001 can simultaneously function as a symbol synchronization accumulator and as a frequency offset compensation accumulator taking account of synchronization symbol errors.

Embodiment 5

Embodiment 5 is an embodiment that detects an accurate frequency offset by changing the accumulation range of complex multiplication results at frequency offset compensation according to the channel quality.

Figure 12:
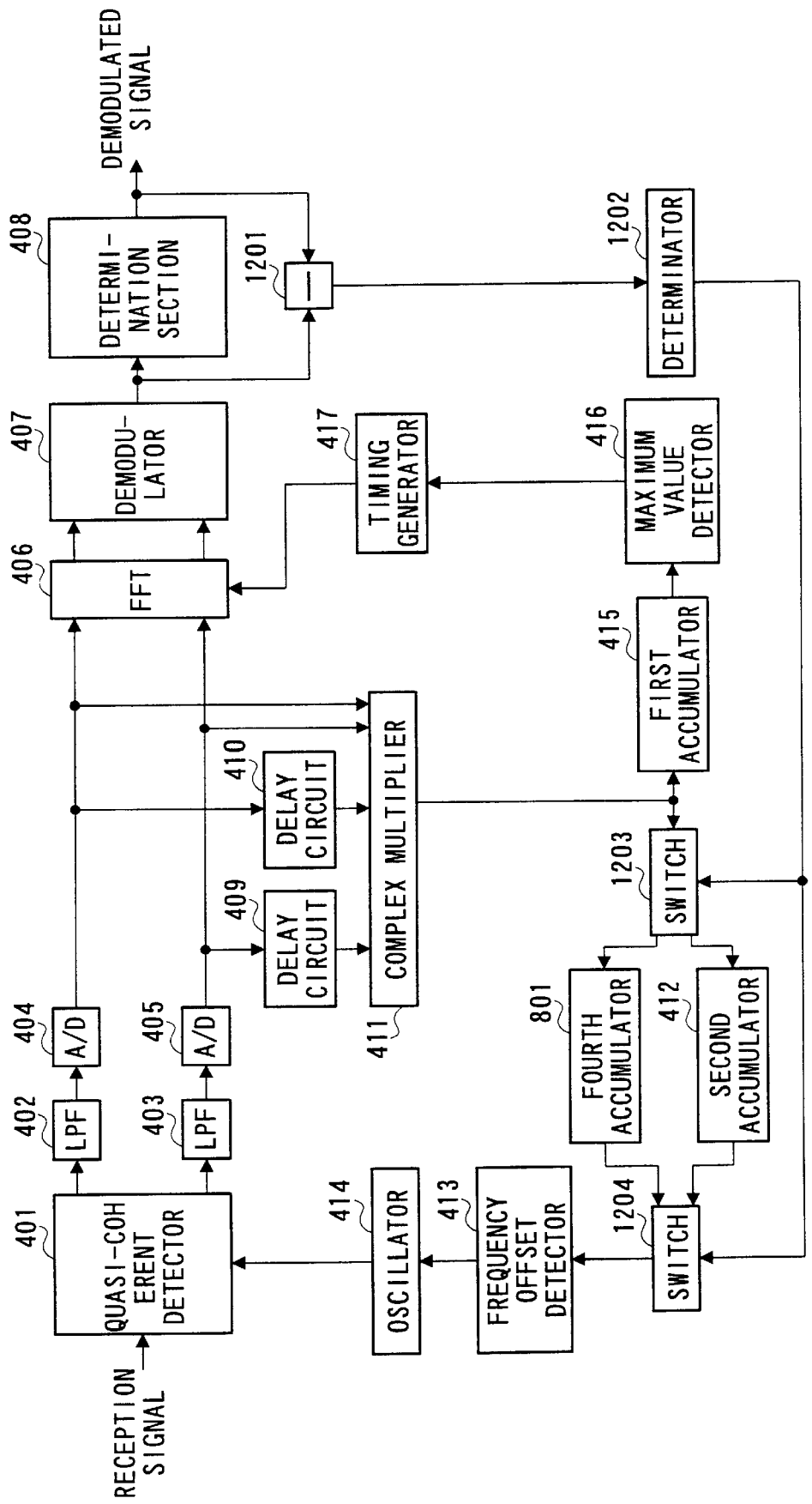
FIG. 12 is a block diagram showing a configuration of an OFDM communication apparatus according to Embodiment 5 of the present invention.

FIG. 12 is a block diagram showing a configuration of an OFDM communication apparatus according to Embodiment 5 of the present invention. The part of configuration in FIG. 12 identical to that in Embodiment 1 (FIG. 4) is assigned the same numbers as in FIG. 4 and detailed explanations are omitted. Moreover, fourth accumulator 801 in FIG. 12 is the same as that in Embodiment 3, and so its detailed explanation is omitted.

When the channel quality is poor, a symbol synchronization difference increases due to influences of multi-path, and therefore the channel quality is measured using the determination difference of a demodulated signal and the accumulation range of complex multiplication results at the time of frequency offset compensation is changed according to the channel quality.

Subtractor 1201 outputs the result of a subtraction (delay dispersion) between a demodulated signal of demodulator 407 and a signal determined by determination section 408 from this demodulated signal to determinator 1202. Determinator 1202 determines whether the subtraction result output from subtractor 1201 is greater or smaller than a predetermined threshold.

If the subtraction result above is greater than the threshold (greater delay dispersion), that is, when the channel quality is poor and.there is a great symbol synchronization difference due to influences of multi-path, determinator 1202 controls switch 1203 so that the multiplication result of complex multiplier 411 is output to fourth accumulator 801. At the same time, determinator 1202 controls switch 1204 so that the accumulation result of fourth accumulator 801 is output to frequency offset detector 413.

On the contrary, if the subtraction result above is smaller than the threshold (smaller delay dispersion), that is, when the channel quality is good, determinator 1202 controls switch 1203 so that the multiplication result of complex multiplier 411 is output to second accumulator 412. At the same time, determinator 1202 controls switch 1204 so that.the accumulation result of second accumulator 412 is output to frequency offset detector 413.

As shown above, according to the present embodiment, determinator 1202 selects either second accumulator 412 or fourth accumulator 801 according to the channel quality, and so it is possible to detect an accurate frequency offset even if the channel quality changes.

The present embodiment explained the case where second accumulator 412 and fourth accumulator 801 are selected as the accumulators The present invention is however not limited to this, but is also applicable to cases where a selection is made from among a plurality of accumulators carrying out accumulations in various types of accumulation ranges according to the channel quality.

Embodiment 6

Embodiment 6 is an embodiment in which a single accumulator serves as two accumulators for frequency offset compensation in Embodiment 5.

Figure 13:
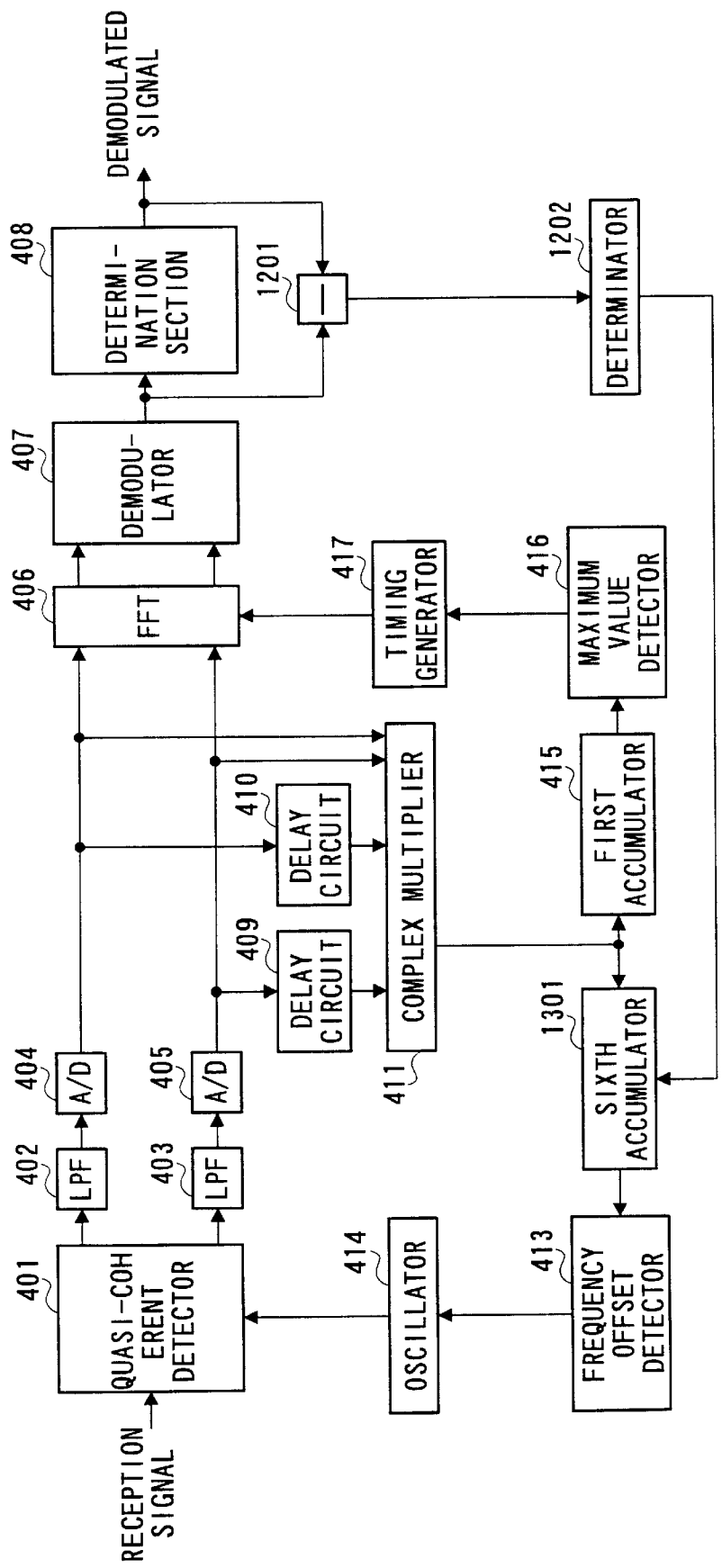
FIG. 13 is a block diagram showing a configuration of an OFDM communication apparatus according to Embodiment 6 of the present invention.

FIG. 13 is a block diagram showing a configuration of an OFDM communication apparatus according to Embodiment 6 of the present invention. The part of configuration in FIG. 13 identical to that in Embodiment 5 (FIG. 12) is assigned the same numbers as in FIG. 12 and detailed explanations of that part are omitted.

Figure 14:
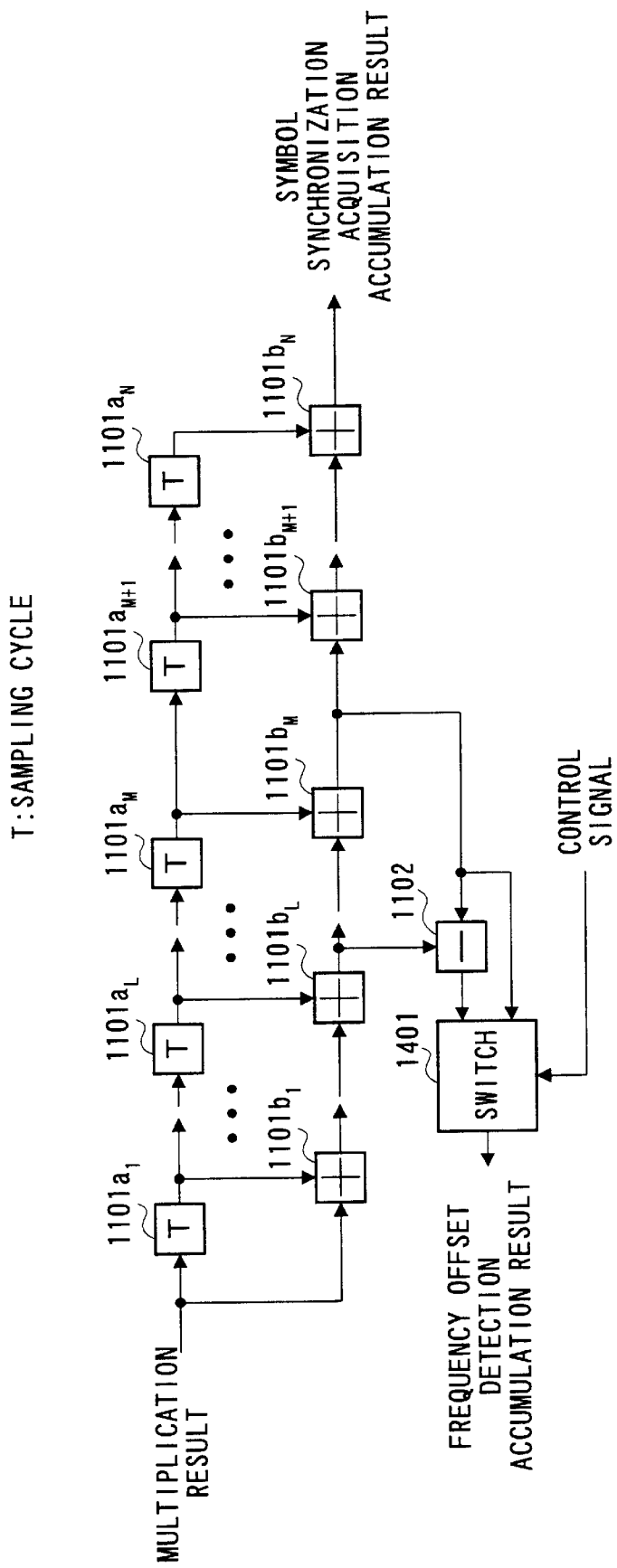
FIG. 14 is a block diagram showing a configuration of a sixth accumulator in the OFDM communication apparatus according to Embodiment 6 of the present invention.

The configuration of sixth accumulator 1301 is explained below using FIG. 14. FIG. 14 is a block diagram showing a configuration of sixth accumulator 1301 in the OFDM communication apparatus according to Embodiment 6. The part of configuration in FIG. 14 identical to that of the fifth accumulator (FIG. 11) in Embodiment 4 is assigned the same numbers and detailed explanations of that part are omitted.

Switch 1401 outputs either the accumulation result of adder 1101$b_M$ only or the subtraction result between the accumulation result of adder 1101$b_M$ and accumulation result of adder 1101$b_L$ to frequency offset detector 413 according to a control signal from determinator 1202. The method of selecting adder 1101$b_M$ or adder 1101$b_L$ and their accumulation results are the same as those described above, and therefore explanations of that method are omitted.

As shown above, according to the present embodiment, sixth accumulator 1301 changes the accumulation range of complex multiplication results according to the channel quality, and so it is possible to detect an accurate frequency offset even if the channel quality changes.

Embodiment 7

Embodiment 7 is an embodiment that improves the accuracy of determining the channel quality in Embodiment 5 and Embodiment 6.

Figure 15:
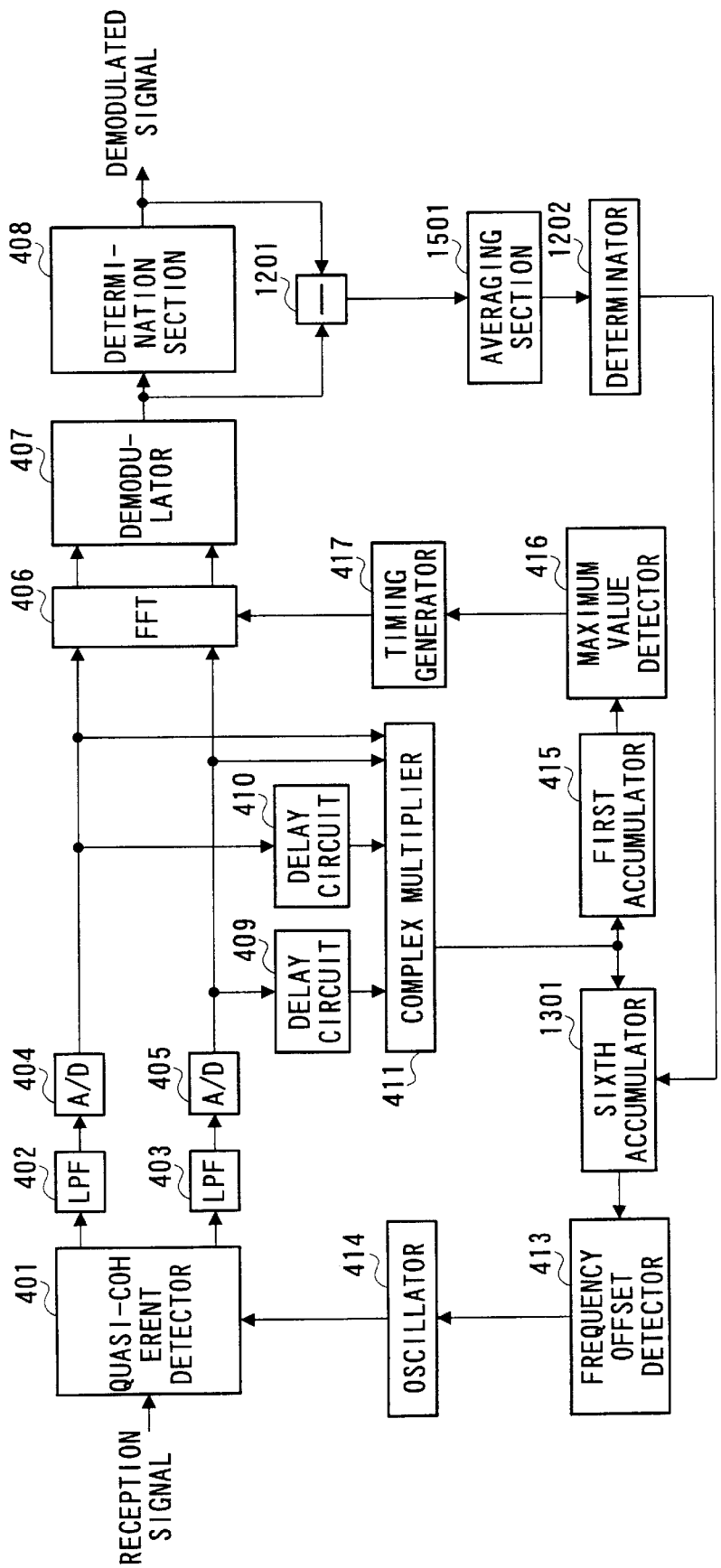
FIG. 15 is a block diagram showing a configuration of an OFDM communication apparatus according to Embodiment 7 of the present invention.

FIG. 15 is a block diagram showing a configuration of an OFDM communication apparatus according to Embodiment 7. The part of configuration in FIG. 15 identical to that in Embodiment 6 (FIG. 13) is assigned the same numbers as in FIG. 13 and detailed explanations of that part are omitted.

Averaging section 1501 averages the subtraction result output form subtractor 1201 and outputs it to determinator 1202. This allows the subtraction result by subtractor 1201, that is, the peak value of the result of measuring the channel quality to be deleted, making it possible to measure the channel quality more accurately. Determinator 1202 determines whether the result output from averaging section 1501 is greater or smaller than a predetermined threshold. The subsequent operation is the same as that described above, and therefore explanations are omitted.

As shown above, according to the present embodiment, averaging section 1501 averages the result of measuring the channel quality and determinator 1202 changes the accumulation range of complex multiplication results with frequency offset compensation according to this averaging result, and it is possible to detect a more accurate frequency offset even if the channel quality changes.

The OFDM communication apparatus of the present invention comprises delayer for delaying a reception signal by a unit symbol, multiplicator for performing a multiplication between the reception signal and reception signal delayed by ,a unit symbol, accumulator for accumulating the multiplication result for a unit symbol period, and frequency offset calculator for calculating a frequency offset based on a accumulation result for a frequency offset accumulation period shorter than the unit symbol period.

The present invention finds a frequency offset based on the accumulation result for a frequency offset accumulation period shorter than a unit symbol period, and therefore it is possible to improve the accuracy of detecting a frequency offset in a multi-path environment.

In the OFDM communication apparatus of the present invention, the frequency offset accumulation period is the last half of the unit symbol period.

The present invention can suppress influences of interference of delay waves and elevate the accuracy of detecting a frequency offset.

The OFDM communication apparatus of the present invention comprises quality measurer for measuring channel quality of a reception signal; and accumulation period changer for changing the length of the frequency offset accumulation period based on the channel quality measured.

The present invention can select an optimal integration bandwidth according to the channel quality, that is, delay dispersion and adaptively improve the accuracy of detecting a frequency offset. Especially, providing a section that simultaneously serves as the accumulation section used for symbol synchronization and the accumulation section for a frequency offset can reduce the hardware scale.

The OFDM communication apparatus of the present invention comprises averager for averaging the result of the channel quality measured.

The present invention averages the result of a measured channel quality, and therefore can delete the peak value of the quality result and improve the accuracy of the channel quality, which allows a selection of an optimal integration bandwidth.

The base station apparatus of the present invention comprises one of the OFDM communication apparatuses above. Furthermore, the communication terminal apparatus of the present invention comprises an OFDM communication apparatus of one of the embodiments above.

The present invention can improve the accuracy of detecting a frequency offset, and therefore allows optimal radio communications in a multi-path environment.

The OFDM communication method of the present invention comprises the steps of delaying a reception signal by a unit symbol, performing a multiplication between the reception signal and reception signal delayed by a unit symbol, accumulating the multiplication result for a unit symbol period, and calculating a frequency offset based on an accumulation result for a frequency offset accumulation period shorter than the unit symbol period.

The present invention finds a frequency offset based on an accumulation result for a frequency offset accumulation period shorter than a unit symbol period, and therefore can improve the accuracy of detecting a frequency offset in a multi-path environment.

The OFDM communication method of the present invention comprises the steps of measuring channel quality of a reception signal, and changing the length of the frequency offset accumulation period based on the channel quality measured.

The present invention can select an optimal integration bandwidth according to the channel quality, that is, delay dispersion and adaptively improve the accuracy of detecting a frequency offset.

Furthermore, the OFDM communication apparatus of the present invention is applicable to a communication terminal apparatus such as a base station apparatus and mobile station apparatus in a radio communication system. This improves the accuracy of detecting a frequency offset, making it possible for optimally performing radio communications in a multi-path environment.

The present invention is not limited to the above described embodiments, and various variations and modifications may be possible without departing from the scope of the present invention.

This application is based on the Japanese Patent Application No.HEI 10-31669:9 filed on Nov. 6, 1998, entire content of which is expressly incorporated by reference herein.

What is claimed is:

1. An OFDM communication apparatus comprising:
a delayer that delays a reception signal by a unit symbol;
a multiplier that performs a multiplication of the reception signal and the reception signal delayed by a unit symbol;
a first accumulator that accumulates the multiplication result of the multiplier for a unit symbol period and outputs a signal on which a processing timing of the reception signal is determined;
a second accumulator that accumulates the multiplication result of the multiplier for an accumulation period shorter than the unit symbol period; and
a frequency offset calculator that calculates a frequency offset based on the accumulation result in the second accumulator,
wherein the accumulation period of the second accumulator excludes a period during which interference occurs due to a delayed wave in a unit symbol period.

2. The OFDM communication apparatus according to claim 1, wherein the accumulation period of the second accumulator is the last half of the unit symbol period.

3. A base station apparatus that comprises the OFDM communication apparatus according to claim 1.

4. A communication terminal apparatus that comprises the OFDM communication apparatus according to claim 1.

5. An OFDM communication apparatus comprising:
a delayer that delays a reception signal by a unit symbol;
a multiplier that performs a multiplication of the reception signal and the reception signal delayed by a unit symbol;
a first accumulator that accumulates the multiplication result of the multiplier for a unit symbol period;
a second accumulator that accumulates the multiplication result of the multiplier for an accumulation period shorter than the unit symbol period;
a frequency offset calculator that calculates a frequency offset based on the accumulation result in the second accumulator;
a quality measurer that measures a channel quality of the reception signal; and
an accumulation period changer that changes the length of the accumulation period for the frequency offset based on the channel quality measured.

6. The OFDM communication apparatus according to claim 5, further comprising:
an averager that averages the measured channel quality;
wherein the accumulation period changer changes the length of the accumulation period for the frequency offset based on the averaged channel quality.

7. An OFDM communication method comprising:
delaying a reception signal by a unit symbol;
performing a multiplication of the reception signal and a reception signal delayed by a unit symbol;
first accumulating the multiplication result for a unit symbol period, and based on the first accumulation result, determining a processing timing of the reception signal; and
second accumulating the multiplication result for a period shorter than the unit symbol period, the shorter period excluding a period during which interference occurs due to a delayed wave in a unit symbol period, and based on the second accumulation result, calculating a frequency offset.

8. An OFDM communication method comprising:
delaying a reception signal by a unit symbol;
performing a multiplication of the reception signal and the reception signal delayed by a unit symbol;
first accumulating the multiplication result for a unit symbol period; and
second accumulating the multiplication result for an accumulation period shorter than the unit symbol period;
calculating a frequency offset based on the second accumulation result of the accumulation period shorter than the unit symbol;
measuring channel quality of the reception signal; and
changing the length of the accumulation period for calculation of the frequency offset based on the measured channel quality.

* * * * *